(12) United States Patent
Macpherson

(10) Patent No.: US 6,898,967 B2
(45) Date of Patent: May 31, 2005

(54) AZIMUTHAL RESISTIVITY USING A NON-DIRECTIONAL DEVICE

(75) Inventor: John Macpherson, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/654,410

(22) Filed: Sep. 3, 2003

(65) Prior Publication Data

US 2004/0123655 A1 Jul. 1, 2004

Related U.S. Application Data

(60) Provisional application No. 60/409,244, filed on Sep. 9, 2002.

(51) Int. Cl.[7] .............................................. E21B 49/00
(52) U.S. Cl. .................................... 73/152.05; 324/338
(58) Field of Search ............................. 33/302; 702/11; 73/152; 324/338

(56) References Cited

U.S. PATENT DOCUMENTS

| | | | | |
|---|---|---|---|---|
| 4,899,112 A | | 2/1990 | Clark et al. ................. 324/338 |
| 4,956,921 A | * | 9/1990 | Coles ........................... 33/304 |
| 5,012,412 A | * | 4/1991 | Helm ............................. 702/9 |
| 5,159,577 A | * | 10/1992 | Twist .......................... 367/25 |
| 5,168,234 A | * | 12/1992 | Freedman .................... 324/338 |
| RE34,975 E | * | 6/1995 | Orban et al. ................... 367/34 |
| 5,473,158 A | * | 12/1995 | Holenka et al. ............. 250/254 |
| 5,513,528 A | * | 5/1996 | Holenka et al. .......... 73/152.03 |
| 5,564,193 A | * | 10/1996 | Brooks ......................... 33/302 |
| 5,565,624 A | * | 10/1996 | Deboaisne et al. ....... 73/152.02 |
| 5,892,361 A | * | 4/1999 | Meyer et al. ............... 324/338 |
| 5,892,460 A | * | 4/1999 | Jerabek et al. ........... 340/856.4 |
| 5,899,958 A | * | 5/1999 | Dowell et al. ................. 702/6 |
| 6,181,138 B1 | * | 1/2001 | Hagiwara et al. ............ 324/338 |
| 6,288,548 B1 | | 9/2001 | Thompson et al. .......... 324/339 |
| 6,307,199 B1 | * | 10/2001 | Edwards et al. .......... 250/269.3 |
| 6,584,837 B2 | * | 7/2003 | Kurkoski .................. 73/152.02 |
| 6,631,328 B2 | * | 10/2003 | Haugland ....................... 702/7 |
| 6,671,623 B1 | * | 12/2003 | Li ................................... 702/7 |
| 6,727,705 B2 | * | 4/2004 | Frey et al. ................... 324/338 |
| 6,727,707 B2 | * | 4/2004 | Sinclair et al. ............. 324/369 |
| 6,734,675 B2 | * | 5/2004 | Fanini et al. ................ 324/339 |
| 2002/0117299 A1 | | 8/2002 | Haugland et al. ......... 166/254.2 |

\* cited by examiner

Primary Examiner—Hezron Williams
Assistant Examiner—John Fitzgerald
(74) Attorney, Agent, or Firm—Madan, Mossman & Sriram, P.C.

(57) ABSTRACT

A method of measuring resistivity values in relation to the azimuthal displacement of a measurement sensor displayed on a measurement-while-drilling device in a wellbore environment is disclosed. The present invention also provides an instantaneous reading of resistivity values. A resistivity sensor measures a volume having a circular cross-section, and whose center is the geometric center of the tool. Averaging removes measurement errors, such as those due to tool motion. Information on the formation resistivity is obtained as a function of the location of the center of the tool. A method of acoustic standoff determines offset of the drill tool and distances to walls. The operator gains knowledge of bedding layer formation and dip from azimuthal dependence of standoff and resistivity values.

40 Claims, 7 Drawing Sheets

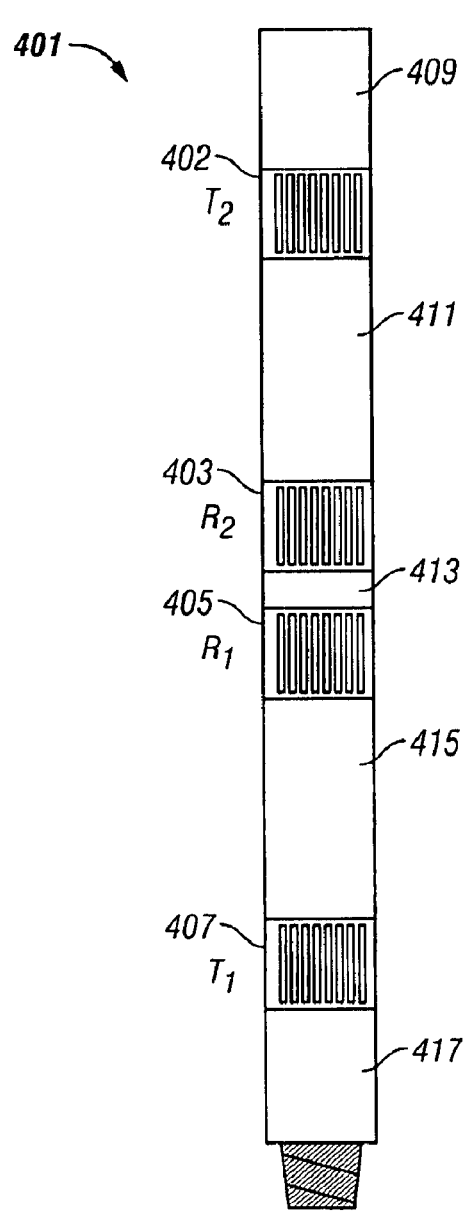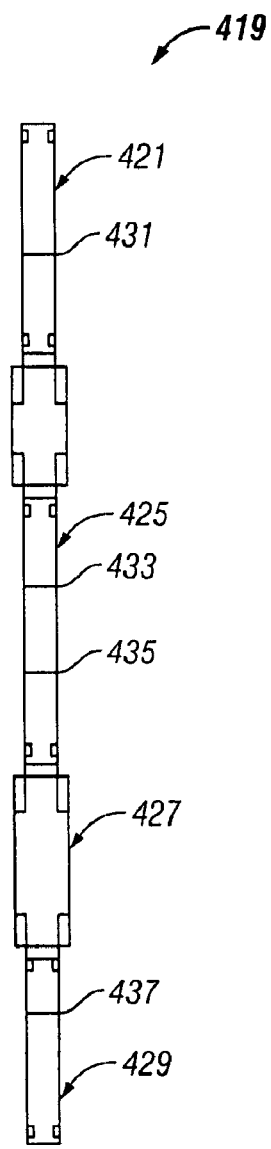
FIG. 2A
(Prior Art)
FIG. 2B
(Prior Art)

AZIMUTHAL RESISTIVITY USING A NON-DIRECTIONAL DEVICE

CROSS REFERENCES TO RELATED APPLICATIONS

This application claims priority from U.S. Provisional Patent Application Ser. No. 60/409,244 filed on 9 Sep. 2002.

BACKGROUND OF THE INVENTION

1. Field of the Invention

The invention relates to the field of measurement-while-drilling systems in a downhole environment. Specifically, the invention is a method of measuring azimuthal resistivity values taken in a measurement-while-drilling device in a downhole environment.

2. Description of the Related Art

Measurement devices comprised of multiple transmitter and receiver arrays have been employed in prior borehole induction logging. The primary parameter of interest is the resistivity of the virgin or uninvaded formation, from which the hydrocarbon saturation of the formation is determined. Symmetric pairs of transmitters and receivers have been employed to minimize or "cancel" the effects on the resistivity measurements of rapidly changing borehole parameters such as borehole diameter, eccentricity and rugosity.

U.S. Pat. No. 4,899,112 to Clark et al. discloses a well logging technique in which electromagnetic propagation waves are used to measure formation resistivity at different radial depths of investigation. In addition, Clark '112 teaches methods for determining the existence, location and properties of beds and caves, and also teaches a method for determining changes in the size of the borehole. These measurements are based upon the observation that phase and amplitude of apparent resistivity measurements, made at a given transmitter frequency and a given transmitter-receiver spacing, exhibit different depths of investigation. Multiple transmitter-receiver spacings have also been employed in prior art to obtain measurements into the formation of varying radial depths of investation. Combining such measurements tends to minimize borehole effects as well as to yield information concerning the radial extent of the invasion of drilling fluid into the virgin formation. Invasion measurements can be related to the permeability of the formation which, in turn, is related to the producibility of fluids contained within the formation rock matrix. No attempts have been made in the prior art to obtain quantitative measures of physical characteristics of the borehole in conjunction with measures of electromagnetic properties of the formation. Multiple transmitter frequencies have also been applied in the prior art to enhance and separate electromagnetic properties of the formation such as resistivity and dielectric constant, obtaining varying effective radial depths of investigation and to a lesser extent to minimize borehole effects. Once again, contributions from the borehole effects have not been quantified and related to the physical condition of the borehole.

U.S. Pat. No. 6,288,548, issued to Thompson et al., the contents of which are incorporated herein by reference, discloses an apparatus for resistivity measurements in a measurement-while-drilling device. The apparatus comprises a transmitting member for generating an interrogating electromagnetic field for passage through the borehole and surrounding formation. A measurement tubular is also provided which comprises a central bore which communicates with a central bore of the drillstring. Said measurement tubular couples in the drillstring to locate the measurement sonde in a particular position, and to permit interrogation of the borehole and surrounding formation with the interrogating electromagnetic field. A means is provided for securing the measurement sonde in a particular location within the central bore of the measurement tubular. The measurement-while-drilling apparatus is operable in at least a transmission mode of operation and a reception mode of operation, which preferably occur simultaneously. During transmission operations, the interrogating electromagnetic field is generated by the measurement sonde and radiated outward from the measurement sonde and through the measurement tubular into the borehole and surrounding formation. During reception operations, the interrogating electromagnetic field passes from the borehole and surrounding formation through the measurement tubular for detection by the receiving member.

The invention of U.S. Pat. No. 5,892,361, issued to Meyer, Jr. et al. discloses a method measuring electromagnetic parameters by detecting phase and amplitude of induced signals at different receivers. Transmitters are activated sequentially at a first frequency. The phase and amplitude of the induced electromagnetic signals within the receivers are measured, yielding two measurements of amplitude and two measurements of phase shift for each transmitter activation for a total of sixteen measurements. The procedure is then repeated at a second transmitter frequency yielding an additional two measurements of amplitude and two measurements of phase shift for each transmitter activation for an additional sixteen measurements. An apparent resistivity measurement is calculated from each of these thirty-two uncorrected "raw" measurements. Each apparent resistivity calculation, being uncorrected as previously mentioned, is greatly affected by the borehole and the near borehole environs. These raw measurements and corresponding apparent resistivity calculations are used, therefore, to determine borehole characteristics such as borehole diameter, rugosity and eccentricity as well as for correcting apparent resistivity measurements for these borehole effects. Stated another way, the invention not only provides formation resistivity measurements corrected for perturbing effects of the borehole, but also provides a method for quantifying these corrections, thereby providing useful information on the physical properties of the wellbore. These wellbore properties, in turn, can be related to such parameters as mechanical properties of the rock matrix, shallow invasion profiles, and the effectiveness of the drilling program.

The borehole instrument portion of Meyer Jr., '361 comprises an elongated mandrel such as a drill collar and a measurement-while-drilling (MWD) embodiment. Two receivers comprising coils of one or more turns are wrapped around the outside diameter of the drill collar and spaced longitudinally along the center of the drill collar. Four transmitters comprising coils of one or more turns are wrapped around the outside diameter of the drill collar and are spaced symmetrically and on either side of the midpoint between the two receiver coils. However, the method of Meyer Jr. '361 does not provide a resolution of resistivity values along the circumference of the drill tool.

U.S. patent application Ser. No. 10/262,548 of Fanini, et al, discloses an induction logging tool that includes transverse coils. With the device disclosed therein, it is possible to make measurements of resisitivities of earth formations that are directionally sensitive. There are several prior art patent applications and that discuss the interpretation of data acquired with such a multi-component tool. One particular application of such multicomponent resistivity tools is determination of a distance to a bed boundary in a substantially horizontal borehole. The hardware of such multicomponent tools is relatively complex, and there may be problems ensuring the relative calibration of the different components.

There is a need for a quick efficient method of resolving an azimuthal resistivity or instantaneous value of resistivities measurements. The present invention described herein meets that need.

SUMMARY OF THE INVENTION

The present invention is a method and apparatus for determining a resistivity parameter of an earth formation using a non-directional resistivity logging tool within a borehole penetrating said earth formation. Measurements are made with the resistivity sensor at a plurality of rotational positions of the logging tool that are not at the center of the borehole. Measurements of a toolface angle are made using an orientation sensor such as a magnetometer. x- and y- accelerometer measurements are also made. Deviations of the accelerometer measurements from a smooth curve (such as a sinusoid) are indicative of tool displacements from the center of the borehole. By double integration of these deviations, the tool position in the borehole can be determined. Based on the differences in the response of the resistivity sensor at different tool positions, locations and orientations of bed boundaries in the earth formation may be determined.

BRIEF DESCRIPTION OF THE DRAWINGS

The present invention is best understood with reference to the following drawings in which like numerals refer to like elements.

FIG. 2A (prior art) depict a measurement tubular in a particular embodiment of the present invention;

FIG. 2B (prior art) depict a measurement sonde in a particular embodiment of the present invention;

DESCRIPTION OF PREFERRED EMBODIMENT

Figure 1A:
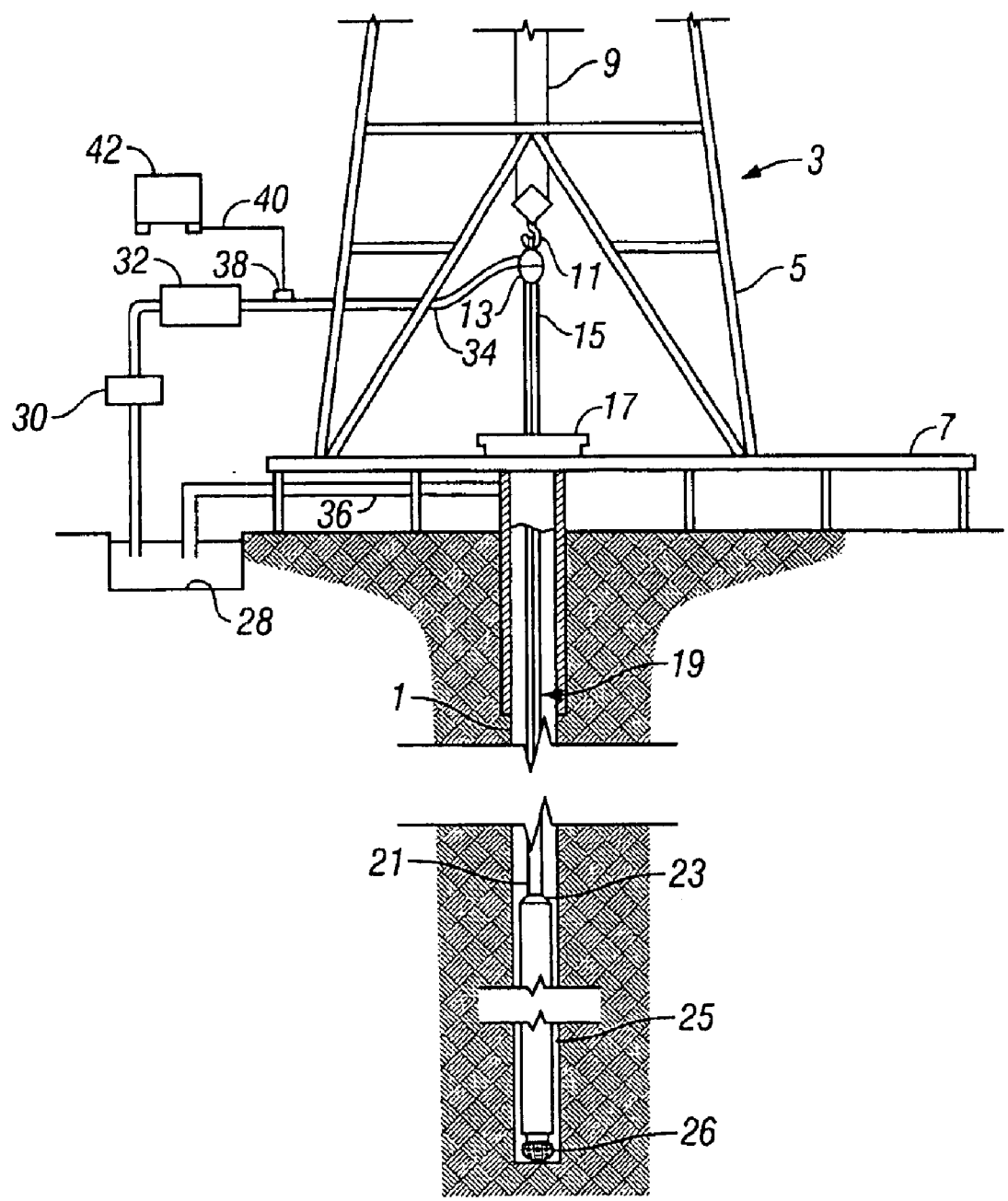
FIG. 1A (prior art) is a simplified depiction of a drilling rig, a drillstring and a wellbore equipped with an apparatus for interrogating the borehole in accordance with the present invention.

With reference to FIG. 1A, there will now be described an overall simultaneous drilling and logging system in accordance with one preferred embodiment of the present invention that incorporates an electromagnetic wave propagation (EWP) resistivity measurement system according to this invention.

A well 1 is drilled into the earth under control of surface equipment including a rotary drilling rig 3. In accordance with a conventional arrangement, rig 3 includes a derrick 5, derrick floor 7, draw works 9, hook 11, swivel 13, kelly joint 15, rotary table 17, and drill string 19 that includes drill pipe 21 secured to the lower end of kelly joint 15 and to the upper end of a section of drill collars including an upper drill collar 23, an intermediate drill collar or sub (not separately shown), and a lower drill collar measurement tubular 25 immediately below the intermediate sub. A drill bit 26 is carried by the lower end of measurement tubular 25.

Drilling fluid (or "mud", as it is commonly called) is circulated from a mud pit 28 through a mud pump 30, past a desurger 32, through a mud supply line 34, and into swivel 13. The drilling mud flows down through the kelly joint and an axial tubular conduit in the drill string, and through jets (not shown) in the lower face of the drill bit. The drilling mud flows back up through the annular space between the outer surface of the drill string and the inner surface of the borehole to be circulated to the surface where it is returned to the mud pit through a mud return line 36. A shaker screen (not shown) separates formation cuttings from the drilling mud before it returns to the mud pit.

The overall system of FIG. 1A uses mud pulse telemetry techniques to communicate data from downhole to the surface while drilling operation takes place. To receive data at the surface, there is a transducer 38 in mud supply line 34. This transducer generates electrical signals in response to drilling mud pressure variations, and these electrical signals are transmitted by a surface conductor 40 to a surface electronic processing system 42.

In one embodiment of the present invention, the device used by Thompson et al, having the same assignee as the present invention and the contents of which are fully incorporated herein by reference, may be used. As taught by Thompson, a measurement system embodying the present invention includes electronics contained in electronics housings contained within measurement sonde 27, shown schematically in FIG. 1C, and contains elements arranged in recesses or necked-down portions of the tubular steel housing of measurement sonde 27. Some of these elements of measurement sonde 27 include upper transmitting antenna 29, lower transmitting antenna 31, and intermediate receiving antennae, 33 and 35, which are carried about an exterior surface of measurement sonde 27, and which are utilized to interrogate the borehole and surrounding formation. In alternative embodiments, a greater or lesser number of transmitting or receiving antennas may be utilized.

Figure 1B:
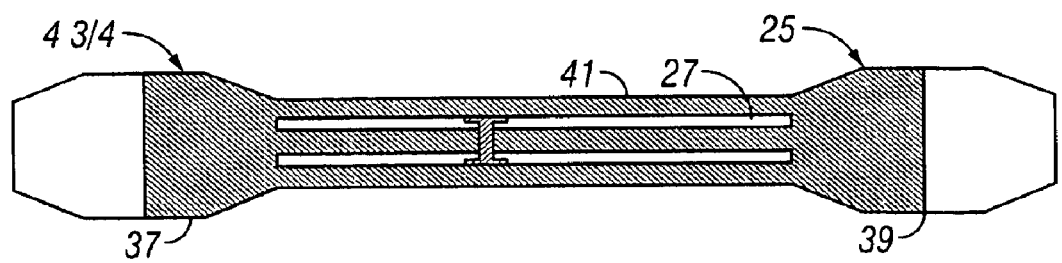
FIG. 1B (prior art) is a partial longitudinal section view of a measurement tubular and measurement sonde in accordance with the present invention.
Figure 1C:
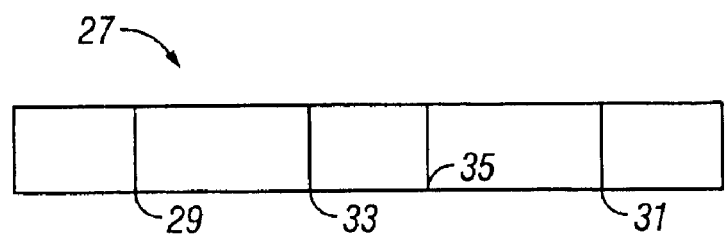
FIG. 1C (prior art) is a simplified schematic view of the antenna arrangement of the measurement sonde of FIG. 1B.

FIG. 1B depicts one embodiment of measurement tubular 25, which includes upper, internally threaded tool joint 37 and lower, internally threaded tool joint 39, which are adapted to couple within a drillstring, with a central section 41 disposed therebetween which is formed of a material which allows the inward and outward propagation of electromagnetic fields, to allow the transmitting antennae, 29 and 31, and receiving antennae, 33 and 35, of measurement sonde 27 of FIG. 1C to communicate with the surrounding borehole and formation. In accordance with the preferred embodiment of the present invention, central section 41 is formed of a material which is either "poorly-conducting" or "non-conducting". For purposes of this disclosure, semiconductors are defined as materials which have a bulk resistivity value of greater than 0.001 Ω-meters and less than 100 Ω-meters. For purposes of this disclosure, non-conducting materials are defined as those materials which have bulk resistivity values which are greater than 100 Ω-meters. Also, for purposes of this disclosure, "good"

conducting materials are defined as having a resistivity of less than 0.001 Ω-meters. Central section 41 need merely be sufficiently strong to provide mechanical strength and convey wellbore fluids, but while also allowing electrical sensors located within the interior of measurement tubular 25 to transmit and receive oscillating electric and/or magnetic fields which are too high in frequency to penetrate the conventional prior art steel drill collars. The prior art steel collars responds to high frequency electric and/or magnetic oscillating fields by the generation of eddy currents which dissipate the field and prevent the communication inward or outward of electric and/or magnetic oscillating fields. Preferably, central section 41 may be composed of KEVLAR-based composite materials.

Using the apparatus of Thompson et al, (commonly called a propagation resisitivty device) it is possible to make a measurement of a resisitivy of an earth formation. Propagation resistivity devices such as those in Thompson determine the resistivity using amplitude changes and or/phase shifts of the propagated signals between two spaced apart receivers. Such methods are well known and are not discussed further here.

FIGS. 2A and 2B depict measurement tubular 401 and measurement sonde 419 which is adapted to be positioned within the central bore 410 of measurement tubular 401. Measurement tubular 401 is composed substantially of steel, as are other prior art drill collars; however, measurement tubular 401 includes four regions which include a plurality of axial slots which are disposed circumferentially about measurement tubular 401 and which extend through the width of measurement tubular 401, but which are filled with a poorly-conducting or nonconducting material, such as a KEVLAR material or such as an epoxy or ceramic material. The axial slots which are filled with nonconducting or poorly conducting material allow for the inward and outward passage of electric and/or magnetic oscillating fields, but which prevent the passage of fluid through measurement tubular 401. As is shown in FIG. 2A, upper transmitter region 402 includes the axial slots which allow for the inward and outward passage of electric and/or magnetic oscillating fields. Likewise, lower transmitter region 401 includes the axial slots which allow for the inward or outward passage of electric and/or magnetic oscillating fields. Receiver regions 403, 405 are provided in a position intermediate the transmitter regions 402, 407. Receiver regions 403, 405 also include the axial slots filled with poorly conducting or non-conducting material, which allow for the inward or outward passage of electric and/or magnetic oscillating fields. The regions which contain the axial slots filled with poorly-conducting or non-conducting material are separated and surrounded by solid regions 409, 411, 413, 415, and 417, which do not allow for the passage of electrical and/or oscillating fields, since they are composed of steel which dissipates the electrical and/or magnetic oscillating field by the formation of eddy currents. Measurement sonde 419 in the depiction of FIG. 2B is disposed adjacent measurement tubular 401 in the depiction of FIG. 2B. In actual use, measurement sonde 419 is disposed within the central bore of measurement tubular 401. Measurement sonde 419 is composed of upper transmitter assembly and pressure housing 421 which contains the upper transmitting antenna, receiver assembly and middle pressure housing 425 which contain the receiving antennas, and lower transmitter assembly and pressure housing 429 which contain the lower transmitter. Upper paddle assembly 423 and lower paddle assembly 427 are provided to centralize and position measurement sonde 413 within the central bore of measurement tubular 403. The electrical, electronic, and data processing components which cooperate to allow for the reception and transmission modes of operation are contained within the pressure housings 421, 425, and 427. Upper transmitter 431 is disposed on the exterior surface of upper transmitter assembly and pressure housing 421 and is adapted to be aligned with transmitter region 402 when measurement sonde 419 is positioned within the central bore of measurement tubular 401. Lower transmitter 437 is carried about the exterior portion of lower transmitter assembly and pressure housing 429 and is adapted in position to be aligned with transmitter region 407 of measurement tubular 401 when measurement sonde 419 is positioned within the central bore of measurement tubular 401. Receiver antennae 433, 435 are carried by receiver assembly and middle pressure housing 425 and adapted in position to align with receiver regions 403, 405 when measurement sonde 419 is positioned within the central bore of measurement tubular 401. The axial slots in measurement tubular 401 which are filled with poorly conducting or non-couducting material allow for the sonde-based measurement of well parameters outside the drillstring which would normally be impeded by the presence of a steel collar. The slots are constructed such that the collar of measurement tubular 401 maintains its structural integrity necessary for drilling operations, and drilling fluids are not allowed to flow through the axial slots since the non-conducting or poorly conducting materials are solid fluid-impermeable materials.

In an alternate embodiment of the invention, resistivity measurements are made using a prior art device such as that taught by Meyer Jr. et al, having the same assignee as the present invention and the contents of which are fully incorporated herein by reference. The device used by Meyer does not have azimuthal sensitivity, i.e., the response of the tool is rotationally symmetric. However, as discussed next, when used in combination with a suitable standoff measuring device, measurements indicative of azimuthal variation of resistivity may be obtained.

Figure 3A:
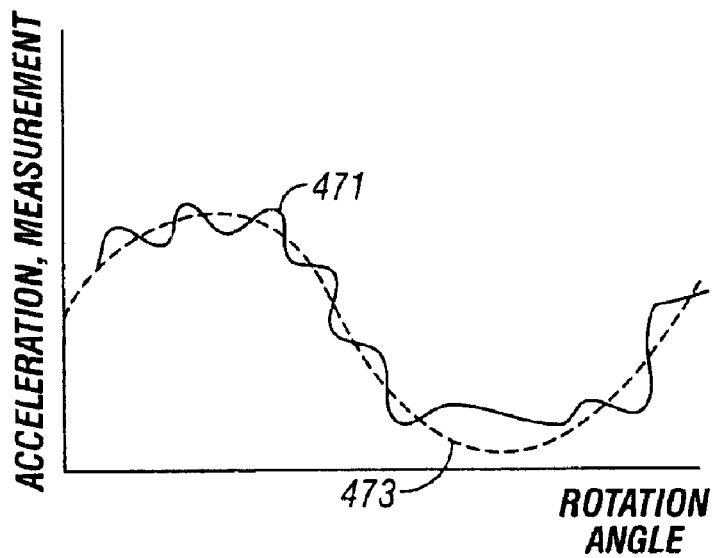
FIG. 3A is a schematic illustration of measurements that would be made by an accelerometer on a drilling tool within a borehole.
Figure 3:
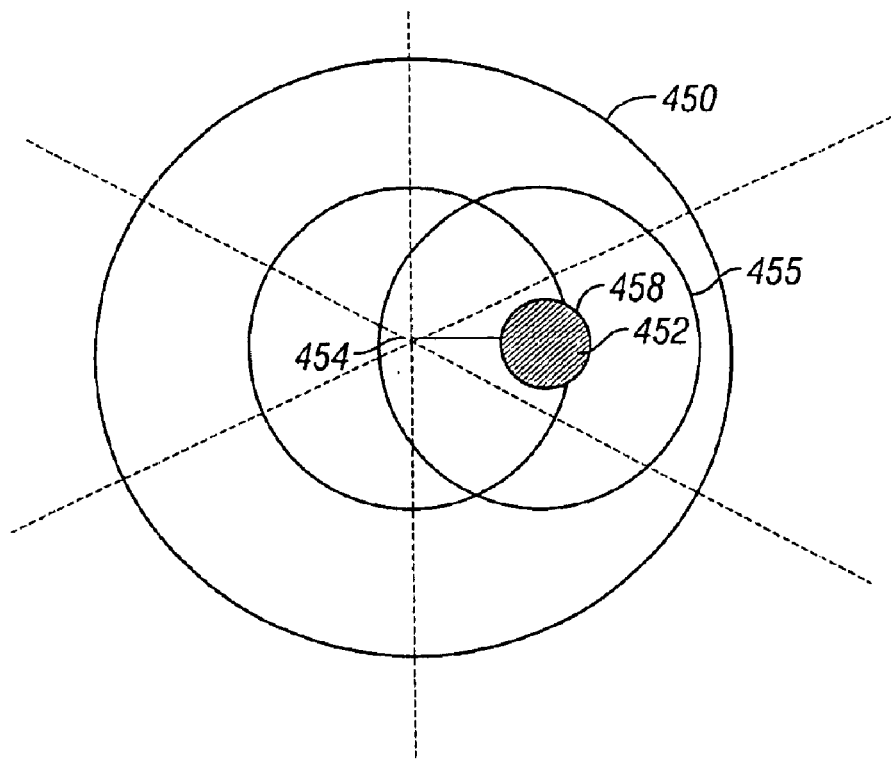
FIG. 3 shows a drill tool of the invention eccentered within a borehole.

FIG. 3 shows the drill tool 455 of the present invention eccentered within a borehole 450. During drilling, the position of the tool center 452 in relation to the center 454 of the borehole can change due to several factors, including "whirl" of the tool, which can change the direction of eccentricity. A fluid path for drilling fluid is generally indicated at 458 at the geometric center of the tool 455 The method of the invention comprises use of a magnetometer and accelerometer, and, optionally, acoustic sensors for standoff measurements. Using the measurements made by the magnetometer and accelerometer and the optional standoff sensors, the position of the drilling tool in the borehole can be determined.

With a tool at a fixed position in the borehole and rotating at a uniform speed, an x and y accelerometer (assuming them to be centered in the tool), will generate a sine and cosine wave due to the rotation of the tool in the earth's gravitational field. Measurements made by the x or y accelerometers in a real drilling tool are schematically depicted in FIG. 3A. The abscissa is an angle of rotation of the rotating tool while the ordinate is the output of one of the accelerometers. Measurements made by an accelerometer are depicted by 471 while an idealized sine wave is shown as 473. The deviation from the sinusoid is due to movement of the center of the tool during drilling operations. Such movement could be due to the phenomenon known as whirl. The deviations from the idealized sinusoid are residuals which are used in the present invention for determining the position of the center of the drilling tool within the borehole.

If the rotation speed of the drillstring is assumed to be uniform, it would be a simple matter to fit a sinusoid to the accelerometer measurements. In a real world situation, the rotation of the drillstring may not be uniform. There are many reasons for the nonuniform rotation, including the so-called "stick slip" effect, variations in the torque applied to the drillstring, and the dynamics of the drillstring itself. The result of this possible non-uniform rotation is that the idealized curve from which residuals are to be measured is no longer a sinusoid. In the present invention, magnetometer measurements are used for determining the smoothing curve.

U.S. Pat. No. 5,564,193 to Brooks, et al. and having the same assignee as the present invention and the contents of which are incorporated herein by reference, teaches a method for determination of a toolface orientation of a drilling sensor using magnetometer measurements. The magnetometer is proximate to the accelerometer, so that there is a constant and known relation between magnetic toolface angle as determined by a magnetometer, and a gravitational toolface angle as seen by an accelerometer. The magnetometer measurements are not responsive to the eccentric motion of the tool as long as the magnetic field seen by the magnetometers is time-invariant. This condition is satisfied as long as there are no magnetic anomalies proximate to the borehole. Hence by using the magnetometer measurements, the residuals (deviation from the smooth curve 473) can be determined. Double integration of the residuals then gives the x and y displacements of the measurement tool from the center of the borehole.

As would be known to those versed in the art, double integration of accelerometer measurements can be unreliable procedure due to lack of knowledge of two integration constants (four in the present case since two accelerometers are involved). However, for the purposes of the present invention, namely determination of a relative position of a tool within a borehole, the problem is not as serious for reasons discussed next.

First, since the diameter of the tool is fixed, and the borehole diameter is substantially fixed, there are physical constraints on the x and y values that are obtained by the double intergration. Additionally, whenever the tool becomes severely off center and hits the borehole wall, the accelerometer measurements will show sharp discontinuities or spikes. These can be used to constrain the solution obtained by double integration, or can be removed by non-linear filtering. Thirdly, the boundary value problem associated with the double integration is reduced since the sensor is rotating in the gravity field and must have an average of 1 unit over time. This bias is removed during the correlation with the magnetometer, so that only the dynamic acceleration is integrated. Finally, in an optional embodiment of the invention, a standoff sensor is used.

Before going into how the method of the present invention is used, we discuss briefly the azimuthal variations that would be detected by a directionally sensitive resistivity sensor and then discuss the implications for the method of the present invention using a non-directional tool.

Figure 4:
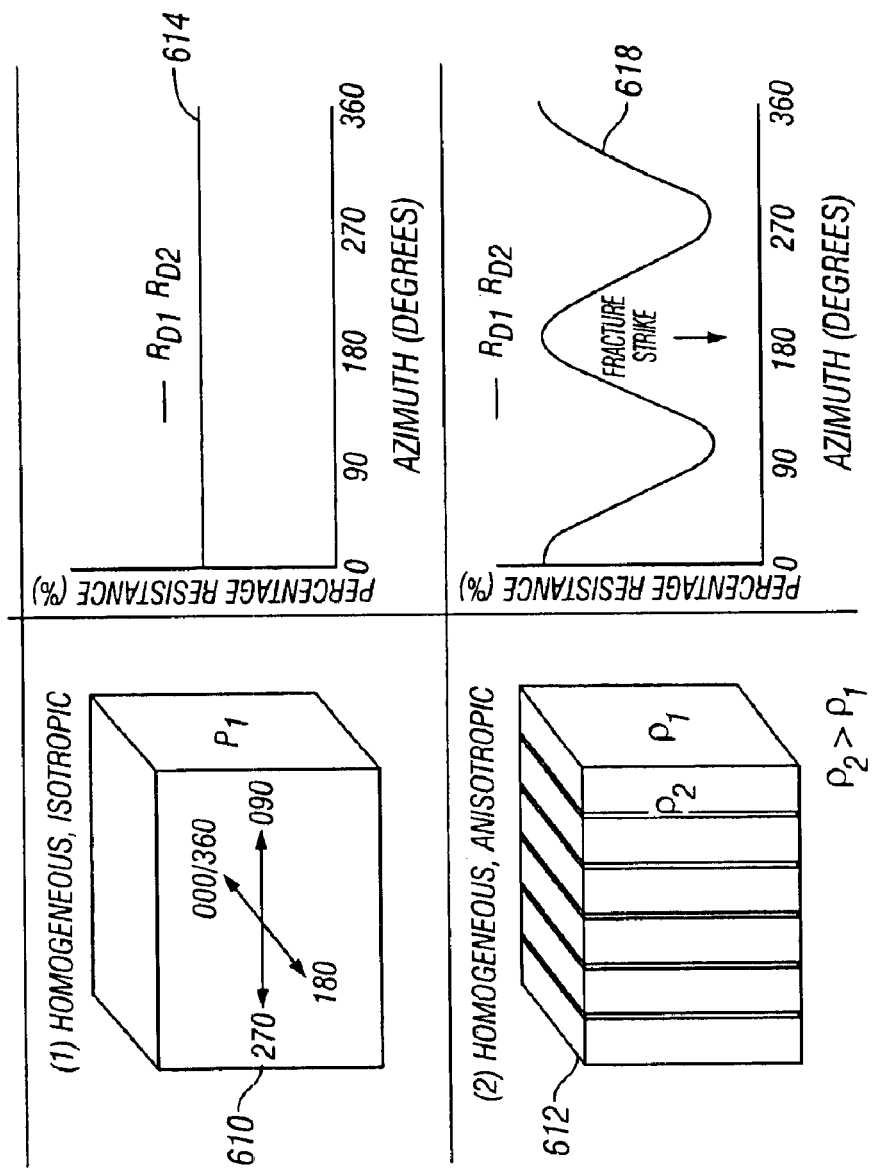
FIG. 4 shows various examples of geological factors and the resulting effects on resistivity measurements.

FIG. 4 shows two prior art examples of earth models and the resulting resistivity measurements obtained with a directionally sensitive resistivity device. For a homogenous isotropic material 610, there is no variation in measured resistivity as a directional resistivity sensor is rotated 614. The model 612 corresponds to an azimuthally anisotropic material, as indicated by the vertical banding in the model. The model consists of two materials with densities $\rho_1$ and $\rho_2$. Rotation of a resistivity sensor through 360° would then give a sinusoidal variation depicted by 618: the peak values corresponding to orientations parallel to the planes of the vertical layers and the trough values corresponding to orientations perpendicular to the layers.

Figure 5A:
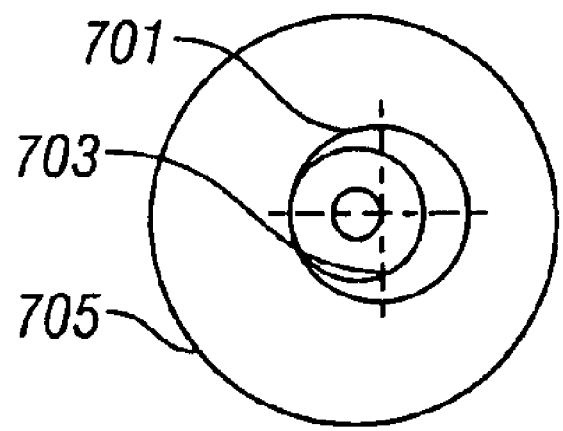
FIGS. 5a, 5b, 5c show regions of sensitivity of a resistivity sensor having no directional sensitivity in a borehole.
Figure 5B:
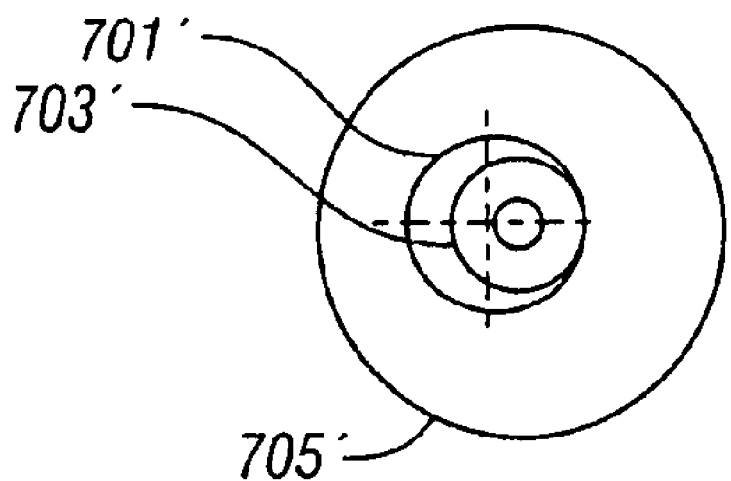
Figure 5C:
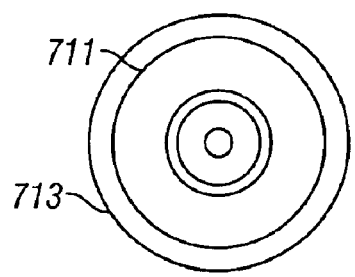

Turning now to FIGS. 5a–5c, the sensitive zone for a tool inside a borehole is illustrated. In FIG. 5a, the tool 703 is shown at the left side of a borehole 701. It is convenient to think of the logging tool as having a circle of sensitivity denoted by 705. In FIG. 5b, the tool 703' is on the right side of the borehole 701' and the circle of sensitivity is denoted by 705'. For the entire suite of possibilities of positions of the tool within the borehole, we can define an inner region 713 for which the tool is affected regardless of the position of the tool within the borehole, and an outer region defined by the annulus between the inner region 713 and the outer boundary 713 for which the effect of the resistivity of the zone depends upon the position of the tool within the borehole. Thus, if there is a bed boundary on one side of the borehole, it should be possible to define its position depending upon where within the borehole the tool happens to be.

Figure 6A:
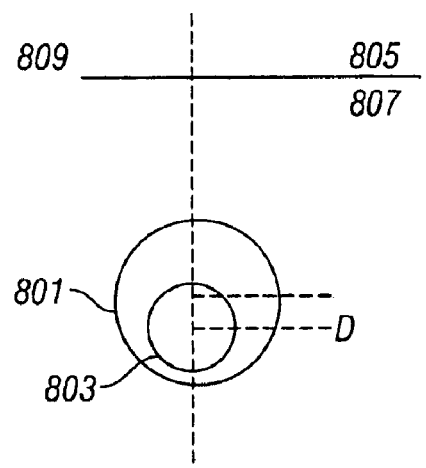
FIGS. 6a, 6b qualitatively illustrate measurements that would be made by a resistivity sensor having no directional sensitivity in proximity to a bed boundary.
Figure 6B:
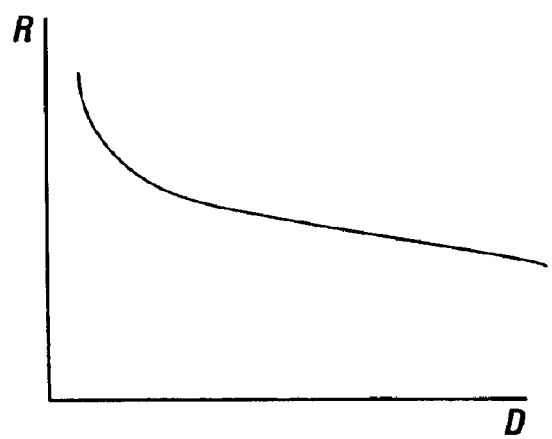

Turning now to FIGS. 6a and 6b, the qualitative response of a resistivity sensor having no directional sensitivity in a borehole proximate to a bed boundary are shown. Shown in FIG. 6a is a logging tool 803 in a borehole 801, the center of the logging tool being displaced a distance D from the center of the borehole. Also shown is a bed boundary 809 between two materials 805 and 807. Shown in FIG. 6b is a depiction of a measurement made by the sensor as a function of the distance D for the case where the material 805 has a higher resistivity than the material 807. For larger values of D, the sensor is further away from the bed boundary and is affected primarily by the lower resistivity medium. For negative values of D, the sensor is closer to the boundary and hence sees a higher resistivity. From a knowledge of the distance D, and knowledge of the response characteristics of the sensor, it is possible to infer the distance from the center of the tool to the bed boundary and the resisitivities of the materials 805 and 807.

To summarize, from magnetometer and accelerometer measurements, the displacements x(t) and y(t) of the tool relative to the center of the borehole can be determined. Simultaneously, a resistivity measurement is made. When the tool is whirling at a fixed distance from the center of the borehole, if the formation has no azimuthal variation of resistivity, then the resistivity measurement made by a nondirectional tool will not depend upon the azimuth. However, it there is an azimuthal variation of resistivity in the earth formation, then this azimuthal variation in resistivity will be detected by the nondirectional tool.

A typical device for measuring azimuthal orientation can be found in CoPilot® from Baker Hughes INTEQ, which contains x-, y-, and z-accelerometers, as well as on-board signal processing capabilities. CoPilot® records and processes downhole vibrational data and can be used, for example, to obtain calculations of x(t) and y(t) values, using an azimuthal reference, which can be added using ROTAZ (rotational azimuth), to determine azimuth while rotating the drill string.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a parameter of a bed boundary in an earth formation using a logging tool within a borehole penetrating said earth formation, said bed boundary being away from the borehole, the method comprising:

(a) obtaining a plurality of first measurements indicative of said parameter of said bed boundary with a first sensor on the logging tool at a plurality of rotational positions of the logging tool, said first sensor having a substantially uniform azimuthal response characteristic; and (b) determining said parameter of said bed boundary from said first measurements made by said first sensor at a spatial position that is not at the center of said borehole.

2. The method of claim 1 wherein said first sensor comprises a resistivity sensor.

3. The method of claim 1 further comprising:

(i) making second measurement with an orientation sensor indicative of a toolface angle of said logging tool at said plurality of rotational positions;

(ii) using at least one additional sensor to make third measurements indicative of said spatial position at said plurality of rotational positions; and (iii) determining from said second and third measurements said spatial position.

4. The method of claim 3 wherein said orientation sensor comprises a magnetometer.

5. The method of claim 4 wherein said magnetometer comprises a two-component magnetometer.

6. The method of claim 3 wherein said at least one additional sensor comprises two additional sensors.

7. The method of claim 6 wherein said at least two additional sensors comprise x- and y- component accelerometers.

8. The method of claim 3 wherein determining said spatial position further comprises determining expected values of said third measurements at said plurality of rotational positions using said second measurements.

9. The method of claim 8 wherein determining said expected values further comprises using a sinusoidal curve fitting.

10. The method of claim 8 wherein determining said spatial position further comprises determining differences between said third measurements and said expected values.

11. The method of claim 10 wherein determining said spatial position further comprises performing an integration of said differences.

12. The method of claim 11 wherein said integration further comprises a double integration.

13. The method of claim 11 further comprising using a constraint for said double integration.

14. The method of claim 13 wherein said constraint is based on a dimension of said borehole.

15. The method of claim 13 wherein said constraint is based on a measurement made by a standoff sensor.

16. The method of claim 1 wherein said parameter of said bed boundary comprises at least one of (i) a position of said bed boundary in said earth formation, and, (ii) an orientation of said bed boundary in said formation.

17. The method of claim 16 wherein determining said parameter of said bed boundary further comprises defining a region in said earth formation to which said resistivity censor is responsive substantially independent of said spatial position of said logging tool.

18. A measurement-while-drilling (MWD) tool for use in a borehole in an earth formation for determining a parameter of a bed boundary away from said borehole, the MWD tool comprising:

(a) a first sensor having a substantially azimuthally uniform response function which makes first measurements at a plurality of rotational positions of the MWD tool indicative off said parameter of said bed boundary;

(b) an orientation sensor which makes second measurements indicative of a toolface angle of said MWD tool at said plurality of rotational positions;

(c) at least one additional sensor which makes third measurements indicative of a spatial position of said logging tool; and (d) a processor which determines from said second and said third measurements said spatial position of said logging tool.

19. The MWD tool of claim 18 wherein said first sensor comprises a resistivity sensor.

20. The MWD tool of claim 18 wherein said at least one additional sensor comprises x- and y- component accelerometers.

21. The MWD tool of claim 18 further comprising a standoff sensor for determining an offset of the tool from a borehole wall.

22. The MWD tool of claim 18 wherein said orientation sensor comprises a magnetometer.

23. The MWD tool of claim 22 wherein said magnetometer comprises a two component magnetometer.

24. The MWD tool of claim 18 wherein said processor further determines expected values of said third measurements at said plurality of rotational positions using said second measurements.

25. The MWD tool of claim 24 wherein said processor further determines said spatial position by determining differences of said third measurements from said expected values.

26. The MWD tool of claim 25 wherein said processor further performs a double integration of said differences.

27. The MWD tool of claim 18 wherein said processor determines said parameter of said bed boundary based on said determined position.

28. The MWD tool of claim 27 wherein said parameter of said bed boundary comprises at least one of (i) a position of said bed boundary in said earth formation, and, (ii) an orientation of said bed boundary in said formation.

29. The MWD tool of claim 27 wherein said processor further determines a region in said earth formation to which said sensor is responsive independent of said spatial position of said logging tool.

30. A system for determining a parameter of a bed boundary away from a borehole in an earth formation, the system comprising:

(a) a bottom hole assembly (BHA) including a device for penetrating said earth formation;

(b) a conveyance device for conveying said BHA into Bald earth formation;

(c) a first sensor on said BHA having a substantially azimuthally uniform response function which makes first measurements indicative of said parameter of said bed boundary at a plurality of rotational positions of the BHA;

(d) an orientation sensor on said BHA which makes second measurements indicative of a toolface angle of said BHA at said plurality of rotational positions;

(e) at least one additional sensor on said BHA which makes third measurements indicative of a spatial position of said BHA relative to a center of said borehole at said plurality of rotational position; and (f) a processor on said BHA which determines from said first, second and third measurements said parameter of said bed boundary.

31. The system of claim 30 wherein said first sensor comprises a resistivity sensor.

32. The system of claim 30 wherein said conveyance device comprises a drillstring.

33. The system of claim 30 wherein said device for penetrating said earth formation comprises a drillbit.

34. The system of claim 30 wherein said orientation sensor comprises a two-component magnetometer.

35. The system of claim 34 wherein said at least one additional sensor comprises x- and y- component accelerometers.

36. The system of claim 30 wherein said processor further determines expected values of said third measurements at said plurality of rotational positions using said second measurements.

37. The system of claim 36 wherein said processor further determines said spatial position by determining differences of said third measurements from said expected values.

38. The system of claim 37 wherein said processor further performs a double integration of said differences.

39. The system of claim 30 wherein said processor determines said parameter of said bed boundary based on a determination of said spatial position.

40. The system of claim 39 wherein said parameter of said bed boundary comprises at least one of (i) a position of a bed boundary in said earth formation, and, (ii) an orientation of a bed boundary in said formation.

* * * * *